United States Patent
Sinha et al.

(10) Patent No.: US 10,104,134 B2
(45) Date of Patent: *Oct. 16, 2018

(54) AUTOMATIC CONFIGURATION OF ENDPOINT COMMUNICATION DEVICES TO SET UP A VOIP NETWORK

(71) Applicant: Extreme Networks, Inc., San Jose, CA (US)

(72) Inventors: Sounak Sinha, Bangalore (IN); Subhankar Dey, Bangalore (IN)

(73) Assignee: Extreme Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/605,692

(22) Filed: May 25, 2017

(65) Prior Publication Data
US 2017/0264650 A1    Sep. 14, 2017

Related U.S. Application Data

(63) Continuation of application No. 14/338,273, filed on Jul. 22, 2014, now Pat. No. 9,680,882.

(60) Provisional application No. 61/857,766, filed on Jul. 24, 2013.

(51) Int. Cl.
*G06F 15/177* (2006.01)
*H04L 29/06* (2006.01)
*H04L 29/12* (2006.01)

(52) U.S. Cl.
CPC ...... *H04L 65/1069* (2013.01); *H04L 61/3085* (2013.01); *H04L 65/1006* (2013.01); *H04L 65/1073* (2013.01); *H04L 61/103* (2013.01); *H04L 61/2015* (2013.01)

(58) Field of Classification Search
CPC ............. H04L 65/1069; H04L 65/1006; H04L 65/1073; H04L 61/3085
USPC .................................................. 709/220, 223
See application file for complete search history.

(56) References Cited

U.S. PATENT DOCUMENTS

| | | | |
|---|---|---|---|
| 9,680,882 B2 * | 6/2017 | Sinha et al. | ........ H04L 65/1069 709/220 |
| 2006/0034195 A1 | 2/2006 | Blaiotta et al. | |
| 2006/0221893 A1 | 10/2006 | Kiss | |
| 2009/0055899 A1 | 2/2009 | Deshpande et al. | |
| 2010/0217837 A1 | 8/2010 | Ansari et al. | |
| 2013/0024575 A1 | 1/2013 | Taylor | |

OTHER PUBLICATIONS

Cisco Systems, "Configurable SIP Parameters via DHCP", Sep. 23, 2012, 9 pages.
Droms, "Dynamic Host Configuration Protocol", Bucknell University, Mar. 1997, 45 pages.

(Continued)

*Primary Examiner* — Philip B Tran
(74) *Attorney, Agent, or Firm* — Haley Guiliano LLP

(57) ABSTRACT

Implementations relate to automatic configuration of endpoint communication devices to set up a communication network such as a VOIP network. In some implementations, a method includes a server receiving an extension request for device extension from an endpoint communications device connected to a communication network, mapping an identifier for the endpoint communications device to a device extension, and transmitting the device extension to the endpoint communications device.

20 Claims, 4 Drawing Sheets

(56) References Cited

OTHER PUBLICATIONS

Littlefield, "Vendor-Identifying Vendor Options for Dynamic Host Configuration Protocol 4 (DHCPv4)", Cisco Systems, Inc., Oct. 2004, 8 pages.
Schulzrinne, "Dynamic Host Configuration Protocol (DHCP-for-IPv4) Option for Session Initiation Protocol (SIP) Servers", Columbia University, Aug. 2002, 7 pages.
USPTO, Final Office Action for U.S. Appl. No. 14/338,273, dated Oct. 21, 2016, 11 pages.
USPTO, First Action Interview, Office Action Summary for U.S. Appl. No. 14/338,273, dated May 11, 2016, 3 pages.
USPTO, First Action Interview, Pre-Interview Communication for U.S. Appl. No. 14/338,273, dated Jan. 14, 2016, 5 pages.
USPTO, Notice of Allowance for U.S. Appl. No. 14/338,273, dated Mar. 1, 2017, 8 pages.

\* cited by examiner

AUTOMATIC CONFIGURATION OF ENDPOINT COMMUNICATION DEVICES TO SET UP A VOIP NETWORK

CROSS REFERENCE TO RELATED APPLICATION

The present application is a continuation of U.S. patent application Ser. No. 14/338,273, filed Jul. 22, 2014 and titled AUTOMATIC CONFIGURATION OF ENDPOINT COMMUNICATION DEVICES TO SET UP A VOIP NETWORK, which claims priority to U.S. Provisional Patent Application No. 61/857,766, filed Jul. 24, 2013 and titled AUTOMATIC CONFIGURATION OF ENDPOINT COMMUNICATION DEVICES TO SET UP A VOIP NETWORK, which are hereby incorporated by reference in their entirety.

TECHNICAL FIELD

Embodiments of the disclosure relate generally to telecommunication systems and more specifically, but not by way of limitation, to telephony systems that utilize digital private branch exchange devices and endpoint communication devices such as telephones and other devices.

BACKGROUND

Internet protocol (IP) telephony employs several protocols to setup and manage calls and other types of sessions. One of the most widely adopted protocols for IP-based signaling and communication sessions is the Session Initiation Protocol (SIP). SIP is used for initiating new calls, manipulating call paths, and enabling the association of services with users regardless of their point of connection in the network. For example, SIP allows multimedia and voice call sessions to be enabled, as well as other functions including call transfer, call termination, mid-call changes, endpoint determination, call forking, etc. The use of SIP as an interface assures that clients and servers in an IP telecommunication system can rely on a common and widely used method for exchanging information.

Many IP telephony systems support both analog private branch exchange devices (PBX) and digital devices (e.g., EPABX (Electronic Private Automatic Branch Exchange) devices). Due to the relative complexity in configuring devices for operation with an EAPBX, many users prefer analog PBXs. What is needed is automatic configuration of endpoint communication devices, such as SIP devices, with digital EAPBXs.

SUMMARY

According to some embodiments, the present technology may be directed to methods that include a server receiving an extension request for device extension from an endpoint communications device connected to a communication network, mapping an identifier for the endpoint communications device to a device extension, and transmitting the device extension to the endpoint communications device.

In various examples, the extension request can include a discover message or request message provided in an address allocation protocol to an address allocation server operative to provide the device extension that is operative for use in a communication session protocol. The device extension can be a session initiation protocol (SIP) extension. For example, the transmitted SIP extension can be included in a DHCPOFFER response that also includes an IP address for the endpoint communications device, an IP address for an SIP server, authentication information, and an extension number. The identifier can include at least one of a media access control address, an international mobile equipment identity number, an Internet protocol address, a personal identification number, a serial number, an international mobile subscriber identity, a mobile equipment identifier, and an integrated circuit card ID.

The method can further include enabling one or more DHCP options on an IP address that may be used by an endpoint communications device to request the SIP extension. The method can include evaluating the extension request to determine the identifier, and evaluating the extension request to determine if the endpoint communications device is configured to receive the device extension, such as checking for one or more particular options included in the extension request.

The method can include establishing a pool of IP addresses for local area network ports on an SIP server, establishing a router management address, enabling a DHCP server on the router management address, enabling an SIP server on the router management address, and programming one or more DHCP options on the router management address, where one of the DHCP options provides an SIP domain, the device extension for the endpoint communications device as an SIP extension, and authentication information.

The method can further include creating the device extension for the endpoint communication device, where the device extension is not being used by any other endpoint communication devices on the communication network. In some embodiments, the method can include retrieving a previously stored device extension mapped to the endpoint communications device. The mapped device extension for the endpoint communications device can be stored in a binding store which resides in a non-volatile memory.

According to various embodiments, the present technology may be directed to a device, e.g., a communications server, that includes a memory for storing executable instructions and at least one processor operative to access the memory and execute the instructions to receive an extension request from an endpoint communications device, map an identifier for the endpoint communications device to a device extension, and transmit the device extension to the endpoint communications device.

In various examples, the device extension can be a session initiation protocol (SIP) extension. The operations can further include evaluating the extension request to determine an identifier, and evaluating the extension request to determine if the endpoint communications device is configured to receive the SIP extension, such as checking for one or more particular options included in the request.

The processor operations can include creating the device extension for the endpoint communication device, where the device extension is not being used by any other endpoint communication devices on a communication network of the endpoint communication device, and/or can include retrieving a previously stored device extension mapped to the endpoint communications device. The mapped device extension for the endpoint communications device can be stored in a binding store which resides in a non-volatile memory coupled to the device.

According to some embodiments, the present technology may be directed to methods that comprise receiving an extension request from an endpoint communications device, and parsing the extension request for an identifier for the endpoint communications device. If the endpoint communications device is configured to receive a session initiating protocol (SIP) extension, the endpoint communications device is provided with a response that includes an SIP extension which has been mapped to the endpoint communications device, and configuration parameters that allow the endpoint communications device to communicatively couple with an SIP server. In some embodiments, the present technology may be directed to a non-transitory machine-readable medium having embodied thereon a program. In some embodiments the program may be executed by a computing device to perform a method similar to those described above.

DETAILED DESCRIPTION

Figure 1:
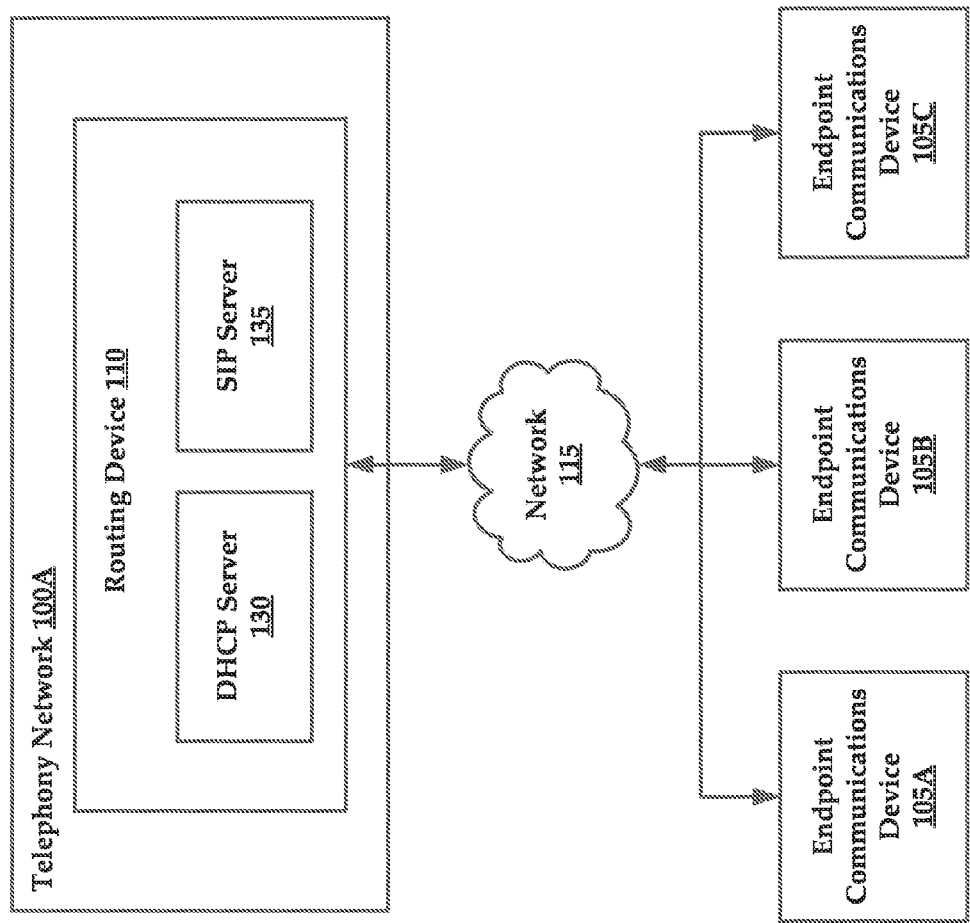
FIG. 1 is a block diagram depicting a telecommunication system suitable for use with embodiments disclosed herein.

The present technology may be directed to the automatic provisioning of device extensions for endpoint communications devices within the context of a network telephony system such as an internet protocol (IP) telephony system. The extensions can be provisioned as part of an automatic (e.g., factory) default configuration of a VOIP network telephony system. For example, the telephony system can utilize a communication session protocol such as the Session Initiation Protocol (SIP). Features described herein allow provisioning of communications device extensions by a mapping of an extension to a compatible endpoint communications device. In some implementations, when an endpoint communciations device is connected to the network, the endpoint device may send out a request to obtain an extension from a server, and the server can map an extension to the endpoint communications device. For example, the server can map the extenstion to an identifier (such as a MAC address) included in the request from the endpoint device. After the extension has been mapped to the identifier of the endpoint device, this binding may be stored in non-volatile storage and pushed to the device.

Such features allow extensions to endpoint communication devices to be automatically assigned to the devices upon their connection to the network. Described features allow users to simply connect the communication devices to the network, e.g., to use a factory default configuration, without any preliminary or subsequent effort towards extension configuration. Furthermore, the assigned extensions can be persistently maintained despite network configuration changes, reboots, or power outages. In some implementations, open standards for protocols such as SIP are used, allowing standardization across a wide variety of devices. Configuration and setup of digital IP PBXs are thus simplified for end users.

Previously, common methods for assigning extensions to endpoint communications devices, such as SIP compatible telephones, were cumbersome processes that required the pre-provisioning of configuration files for each brand of compatible telephones. The configuration information for a telephone would be maintained by a dedicated SIP server that was assigned to the telephone. Thus, each telephone would have its own SIP server, which increased the cost of such systems. The network topology for intraoperative communication within these systems often resembled a peer-to-peer mesh network. Assignment of extensions for these types of mesh networks often required the establishment of dominant and secondary device relationships. Additionally, because telephones manufactured by different companies may require different configuration files, cross compatibility suffered. For example, a mesh network may not work if the mesh network comprised telephones that use different configuration files.

In some previous systems, the IP telephony network can utilize a configuration server, such as a trivial file transfer protocol (TFTP) compatible server or HTTP server, that communicates configuration files to requesting endpoint devices. The requesting endpoint device can receive the IP address of the configuration server from a dynamic host configuration protocol (DHCP) server. That is, when the endpoint device is placed on the network, the device may broadcast a DHCP request message over the network. A DHCP server may transmit the IP address for the configuration server back to the telephone, and the endpoint device then sends a request to the configuration server to ask for a configuration file including an SIP server address and other parameters such as user id, password, and extension number. These parameters have already been predetermined and set up by an administrator for each endpoint device that is to be used on the network, and are keyed to a MAC address of the device. In sum, previous telephony systems utilize "pre-provisioned" configuration files, often in conjunction with configuration file servers. The configuration files are "pre-provisioned" inasmuch as the configuration parameters for an endpoint communications device are created and stored in configuration files which reside on a configuration server prior to the device being placed onto the network.

In contrast, the present technology may employ "post-provisioned" device extensions (e.g., configuration parameters) that allow endpoint communications devices to configure and interoperate on a telephony network without having predetermined configuration information set up beforehand. In some instances, these extensions are "post-provisioned" by a mapping of a device extension to a compatible telephone or other suitable endpoint communications device. That is, when the device is placed onto the network, the device may send out a request to obtain an extension from a server. The extension and other configuration parameters can be automatically determined and sent to the endpoint device after the endpoint device is connected to the network, thus providing an automatic default configuration to connected endpoint devices.

In some example implementations, an endpoint communications device can send a request to an address allocation server that configures and allocates network addresses to clients on the network, such as a DHCP server. In some instances, the DHCP server can service a plurality of endpoint communications devices. The request may comprise a "discover" message or a "request" message. For example, the discover or request message can be a broadcast message used in an address allocation protocol such as DHCP.

The request may comprise an identifier, such as a media access control (MAC) address in some implementations. The identifier may be used to uniquely identify the requesting endpoint communication device on a network. Advantageously, the identifier may be used by a server of the present technology in mapping a device extension to an endpoint communications device.

In some implementations, the request may indicate that the requesting endpoint device desires a particular type of response with specific information including a device extension. For example, the request can require particular option parameters. If the DHCP server determines that the endpoint communications device is requesting these particular options in its request, this information may be used by the DHCP server to distinguish between network devices that require an SIP extension and devices that require other types of addresses or extensions. For example, a laptop or other requesting device that only needs access to a public network, such as the Internet, may not require such parameters and will not include such options in its request to the DHCP server. The DHCP server may use the presence or lack of need for these option parameters as a mechanism to gate incoming requests for SIP extensions.

According to some embodiments, the DHCP or SIP server may, using the identifier included in a request, map an SIP extension to the identifier of the endpoint communications device. Once the SIP extension has been mapped to the identifier of the device, this binding may be stored in non-volatile storage in a router, an SIP server, or a combined router/SIP device.

The DHCP server can return or push a response to the endpoint device that includes the requested information. This information can includes the IP address for the endpoint device and other network information. The response also includes the IP address for a communication session server that controls communications for use with a communication session protocol. For example, the communication session protocol can be SIP and the communication session server can be an SIP server. Furthermore, the response includes the device extension that has been assigned to the endpoint device, and can include authentication information such as user id and password. With this information, the endpoint device is enabled to send and receive communications using the communication session protocol by communicating with the communication session server.

Various example implementations are described herein with reference to the SIP protocol, using SIP-compatible endpoint communications devices and SIP servers providing the extensions to the SIP-compatible devices. Other appropriate communication session protocols can be used in other implementations.

These and other advantages of the present technology will be described herein with reference to the drawings.

FIG. 1 is a block diagram of an example telecommunication environment which can be used with some embodiments described herein. In one embodiment, the system 100 includes endpoint communications devices such as endpoint communications device 105A-C. Each endpoint communications device 105A-C can be a computer device or other electronic device running software to perform SIP user agent functions and including user interface hardware such as a microphone and/or headphones for communicating voice information with a user of the computer or device. Other user interface hardware can also be used, such as interfaces using image or video data and/or other types of communication data, and can use wired or wireless communication techniques. In some implementations, additional user agents can be included in the system 100, e.g., in additional devices of the system. In some implementations, the endpoint devices 105A-C can be standard telephones (e.g., land-line phones or cell phones) connected through a gateway or other connection allowing communication over the network. Examples of the endpoint communication devices 105A-C include mobile phones, desktop computer telephones, wireless handsets, Internet Protocol (IP) softphones, or any of a variety of other communication devices.

A plurality of endpoint communications devices may be communicatively coupled together via a routing device 110. The routing device 110 may comprise, for example, an EAPBX (e.g., a digital private branch exchange). In some instances, the routing device 110 may be a part of a telephony network 100A. In some instances, the telephony network 100A may comprise a network-based telephony system, such as a voice over Internet protocol (VoIP) system. The telephony network 100A can comprise many other components that are known to one of ordinary skill in the art, but for the purposes of brevity, these components will not be discussed in greater detail.

The endpoint communications devices may be communicatively coupled to the routing device 110 via a network 115. The network 115 may comprise any one (or combination) of private or public networks such as wide area networks (WANs), local area networks (LANs), or others types of networks that would be known to one of ordinary skill in the art. In some embodiments, the network 115 can be implemented in one or more of any type of communication network, including widely-used networks such as the Public Switched Telephone Network (PSTN), Internet Protocol (IP) Network, cell phone networks, etc.

The components may be communicatively coupled to the network 115 via hard-wired links (such as power over Ethernet (PoE) port), wireless links, or a combination thereof, and in some embodiments they can include intermediate network entities and/or networks. For example, the system may comprise various configurations of gateways and/or routers. In additional embodiments, the system 100, although not shown, can also include other servers, such as registration servers, redirect servers, directory servers, and/or location servers. In some exemplary embodiments, one or more of the server types can be provided as multiple devices or combined into one physical device.

In some embodiments the routing device 110 may be implemented within a cloud-based computing environment. In general, a cloud-based computing environment is a resource that typically combines the computational power of a large model of processors and/or that combines the storage capacity of a large model of computer memories or storage devices. For example, systems that provide a cloud resource may be utilized exclusively by their owners; or such systems may be accessible to outside users who deploy applications within the computing infrastructure to obtain the benefit of large computational and/or storage resources.

The cloud may be formed, for example, by a network of web servers, with each web server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

According to some embodiments, a communication session protocol used in the system 100 can be the Session Initiation Protocol (SIP). SIP is configured to set up Internet telephone calls, videoconferences, and other multimedia connections. SIP can establish two-party sessions (ordinary telephone calls), multiparty sessions (in which each party to the call can hear and speak), and multicast sessions (one sender, many receivers). The sessions can communicate audio, video, and/or data between the parties participating in the session. SIP handles call setup, call management, and call termination, while other protocols, such as real time protocol (RTP), are used for data transport. SIP is an application layer protocol and can be executed over the user datagram protocol (UDP) or the transport control protocol (TCP), for example. Other appropriate protocols can be used with the features described herein in various embodiments.

According to some embodiments, the routing device 110 may comprise an address allocation server such as a DHCP server 130, as well as a communication session server such as an SIP server 135. In some instances, the functionalities of the DHCP server 130 and the SIP server 135 may be combined together into the routing device 110. It will be understood that the routing device 110 may be referred to generally as a "server." In some instances, the features/functionalities of the DHCP server 130 and the SIP server 135 may exist as layers within a transmission protocol stack utilized by the routing device 110. According to some embodiments, the routing device 110 may comprise a secure router, such as model SR4134, manufactured by Avaya Inc. in a particular example. Other models and routers with appropriate functionality can be used with features described herein.

In other embodiments, the DHCP server 130 and the SIP server 135 may exist as separately configured servers or webservers. These servers may comprise physical or virtual machines provisioned within the telephony system 100A. Any component of the routing device 110 may be embodied as an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules may include separately configured web servers.

Prior to allowing endpoint communications devices to interoperate on the network 115, the routing device 110 may be enabled on a router management IP address. In one non-limiting example, the routing address can be 192.168.1.1 for purposes of explanation herein. Additionally, a pool of available local area network (LAN) ports may be established. In the non-limiting example herein, the ports may be established at 192.168. 1.1/24. Additional or fewer LAN ports may be provisioned.

The DHPC server 130 can be enabled with options and provisioned with necessary functions and addresses to employ features described herein. In one example, the DHCP server 130 may be enabled on the IP address pool 192.168.1.X, where X can be any address from 2 to 254, for example. The DHCP server 130 may also be provisioned with the IP address of the SIP server 135. In the present example, the IP address of the SIP server 135 may include 192.168.1.1. In some examples, DHCP Option 120, which provides a SIP proxy server address to a requesting SIP client, may be enabled and correspondingly programmed to 192.168.1.1, for example. The DHPC server can be configured to send out the Option 120 information to clients that are interested in this information. DHCP Option 125, which provides an SIP domain and vendor-specific configuration parameters, may also be enabled and programmed to 192.168.1.1. The DHPC server can be configured to send out the Option 125 information to clients that are interested in this information. The DHCP Option 125 may be provided in a response to the endpoint communications device via the DHCP server 130. Thus, the various servers and options may be associated with the same router management IP address, although unique configurations for each of these devices and/or options may likewise be employed.

When an endpoint communications device is coupled to the network 115, the endpoint communications device may send or broadcast a request via the network 115, which is received by the DHCP server 130. In some examples, the request provided by the endpoint device and received by the DHCP server 130 may comprise a DHCP "discover" or a DHCP "request" message. A discover message may be used when the endpoint communications device is new on the network. The term "new" may encompass the introduction of a device that has never been assigned an SIP extension or a device that was previously assigned an extension, but that extension has been purged or otherwise deleted from the SIP server or is otherwise unavailable. A request message may be used when the endpoint device was previously connected to the network and DHCP server and became disconnected, and now is re-requesting address and other information.

The sent request includes information including a request for its own address (such as an IP address) on the network, as well as other needed information, e.g., DNS server addresses and domain name of the server. This requested information is typically provided to any requesting device on the network. However, according to the features described herein, the endpoint device request also includes a number of particular options to request parameter information needed by the endpoint device to communicate via the communication session protocol such as SIP.

In some implementations, the SIP option parameters included in the request include an option that requests the address of the SIP server. For example, this can be an Option 120 request under the SIP standard (RFC 3361). Furthermore, the SIP request options can request information including an SIP domain, a SIP device extension for the endpoint device, and user authentication information (such as user id and password). For example, this can be an Option 125 request under the SIP standard (RFC 3925), in which vendor-specific information can be implemented to provide these parameters. Other formats and options can be used in other implementations. In some implementations, at least some of these parameters can be requested in a format of type-length-value (TLV), which provides unknown values with the type and length information for those values.

The device extension requested by the endpoint device is an extension number that allows the endpoint device to communicate with other endpoint devices using a communication session protocol such as SIP. For example, one endpoint device can initiate a call session to a particular other endpoint device by sending a call request to the extension of the other endpoint device. Such call sessions are implemented by the use of an SIP proxy server such as server 130.

Upon receipt of the request, the DHCP server may examine the request for particular options. Upon finding SIP option requests under Options 120 and 125 as described above, the DHCP server knows that the requesting device is an endpoint device requesting an SIP extension and other needed SIP information. Thus, the DHCP server 130 obtains the requested information and provides a response to the endpoint communication device that includes that information. In some implementations, for example, the DHCP server 130 may transmit a DHCPOFFER response to the endpoint communications device. According to some embodiments, the DHCPOFFER response may comprise an IP address for the endpoint communications device (selected from the private pool of IP addresses). The response may also comprise IP addresses of DNS servers and a domain name for the DHCP server 130. This information is in a standard response by the DHCP server to any device on the network. In addition, specific to features herein, the response also comprises an SIP Proxy Server IP address (e.g., Option 120) and an SIP domain (e.g., Option 125). The response may also comprise an SIP extension for the endpoint communications device (e.g., Option 125). Additionally, the response may comprise authentication data for the extension number, such as a user name/id and/or password (e.g., Option 125).

The SIP extension number provided in the response to the endpoint device may be determined by the DHCP server 135 (or by the SIP server 130). This determination can include parsing the request to determine an identifier included in the request. The identifier may comprise any identifier that may be used to uniquely identify the requesting endpoint communications device on the network 115. For example, in various implementations the identifier can be a MAC address, an international mobile equipment identity number, an Internet protocol address, a personal identification number, a serial number, an international mobile subscriber identity, a mobile equipment identifier, and/or an integrated circuit card ID.

In some implementations, the DHCP server passes the parsed identifier to the SIP server 135 to determine the extension number (alternatively, the DHCP server can determine the extension number). The SIP server 135 may compare the identifier from the request against a binding store (e.g., table) that comprises mappings between identifiers and associated SIP extension values. If a match exists for the identifier in the binding store, this indicates that the requesting endpoint device was already previously initialized and configured on the network and its extension previously determined and stored in the binding store. The SIP server 135 may retrieve and provide the stored SIP extension associated with the matched identifier to the DHCP server 130, which may return that extension with its response to the endpoint communications device. The endpoint communications device may communicate with other endpoint communications devices on the network 115 via the SIP server 135 using that SIP extension.

If a match does not exist, it indicates that the requesting endpoint device is new to the network and being initialized. The SIP server 135 may create a new mapping between a new, available SIP extension and the identifier for the requesting endpoint communications device. The mapping may be stored in the binding store. A new SIP extension may be created in any of a variety of ways. In some implementations, the extension can be derived from system information such as a port number to which the endpoint device is current connected, the endpoint device type, etc. The created SIP extension is then added to the response by the DHCP server, and that response is provided to the endpoint communications device.

An example of determining a new SIP extension for a new requesting endpoint communication device is now described. In some example implementations, to ensure that a deterministic extension is allocated to the SIP phone, the SIP server may provide a six-digit extension (e.g., A BC DEF) based on the following example mapping:

A=1 for wired endpoint communications devices, A=2 for Wireless (e.g., Wifi) SIP client endpoint communications devices;

BC=Router port number for wired endpoint communications devices. If an endpoint communications device is connected on port 4, BC=04; if an endpoint communications devices is connected on port 23, BC=23. It is assumed that SME routers which may need configuration-free IP PBX will have less than 99 ports. BC=00 may be utilized for WiFi SIP endpoint communications devices; and DEF=extension number provided for endpoint communications devices.

The three extension digits thus can allow 1,000 extension devices per port. For example, in some communication environments, end users such as in a small enterprise may have one telephone or other endpoint device connected to each power over Ethernet (PoE) port of the router (or other system) running the SIP server 135. The needs of such users may often easily be met by such a scheme. Other mapping schemes can be used in various other implementations, e.g., to provide more extension numbers.

According to some embodiments, the MAC-to-extension binding table utilized by the SIP server 135 may be saved to a non-volatile storage in the routing device 110 so that the data is persistent across reboots. For example, these entries can be designated so that they may not be aged out. In some implementations, a field can be kept to indicate when each extension was created, e.g., when the SIP REGISTER packet was used for each entry. If the number of entries goes beyond system capabilities or user-designated limits, the entry with the oldest created extension may be cleared, and this extension may be reused.

In an exemplary operation, an endpoint communications device is connected to the network 115. During boot up, the endpoint communications device may broadcast a request that is received by the DHCP server 130. The request may be parsed to determine an identifier identifying the endpoint device and the server creates or retrieves an SIP extension for the endpoint device corresponding with the identifier. The DHCP server 130 forms a response including information allowing the endpoint communications device to communicate with the SIP server 135. The SIP extension may be included in this response. Using the various parameters and configuration information included in the response, the endpoint communications device may communicate with the SIP server and interoperate with other endpoint communications devices on the network through the SIP server using the SIP protocol.

According to some embodiments, the SIP server 135 may utilize network address translation (NAT) to help prevent resource conflicts between IP addresses used by endpoint communications devices within the network 115 and to keep the IP addresses within the IP address pool private.

Figure 2:
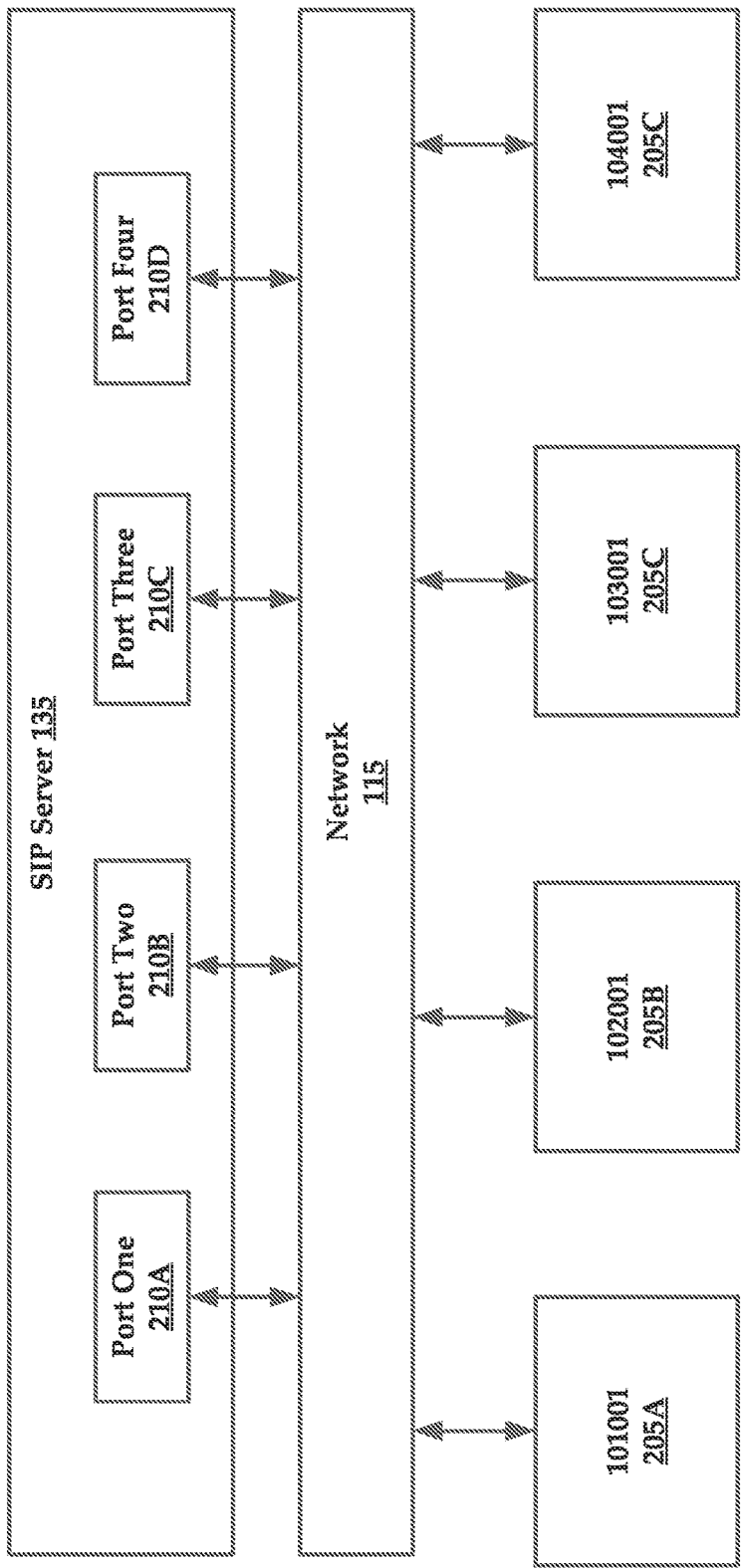
FIG. 2 illustrates an example of an allocation of extensions for various endpoint communications devices and SIP port utilization.

FIG. 2 includes an exemplary extension allocation for four wired endpoint communications devices 205A-D connected to four ports 210A-D of a router (such as the routing device 110) with factory default configurations. Using the preceding extension allocation schema as an example, the wired endpoint communications devices 205A-D may have example extensions of: 101001, 102001, 103001 and 104001, respectively, for the first four ports of the router. In another example, the first three WiFi SIP clients to be mapped may have extensions of 200001, 200002, and 200003, respectively.

In another exemplary embodiment (not shown), if more than one endpoint communications device is connected to a single port on the router, the endpoint communications device will get the next sequential extension. For example, three wired phones connected to port 12 of a router will have extensions of 112001, 112002, and 112003. Even if the phones are moved from one port to another, they will carry the same extensions, since the MAC to extension entry exists in the mapping store. This allows persistent use of extensions over time, as is typically desired by users.

In some implementations, if the end user of an endpoint communications device is confused to what extension has been allocated to that device, the end user can dial a special sequence from the phone (such as 411). The server receives the sequence and can provide a voice prompt or other type of message from the server to the device, announcing the allocated extension of the device.

According to some embodiments, when an endpoint communications device sends out a SIP REGISTER or INVITE packet, it will include the credentials received via the DHCPOFFER response referenced above.

In some implementations, routing devices, such as routing device 110, may comprise a factory default configuration with auto-configuration turned on. If the user does not want this behavior, the end user may log into a management console of the routing device 110 and turn off the auto-configuration option and clear the MAC-extension binding table.

The use of standard Options such as Option 120 (RFC 3361) and Option 125 (RFC 3925) in the examples described above allows a wide variety of endpoint communication devices to be used with the features described herein. In the example of Option 125, the vendor-specific information provided by the server can include the SIP domain, extension, and authentication data described above. In some implementations, such vendor-specific information or formats can be published for wide use.

Figure 3:
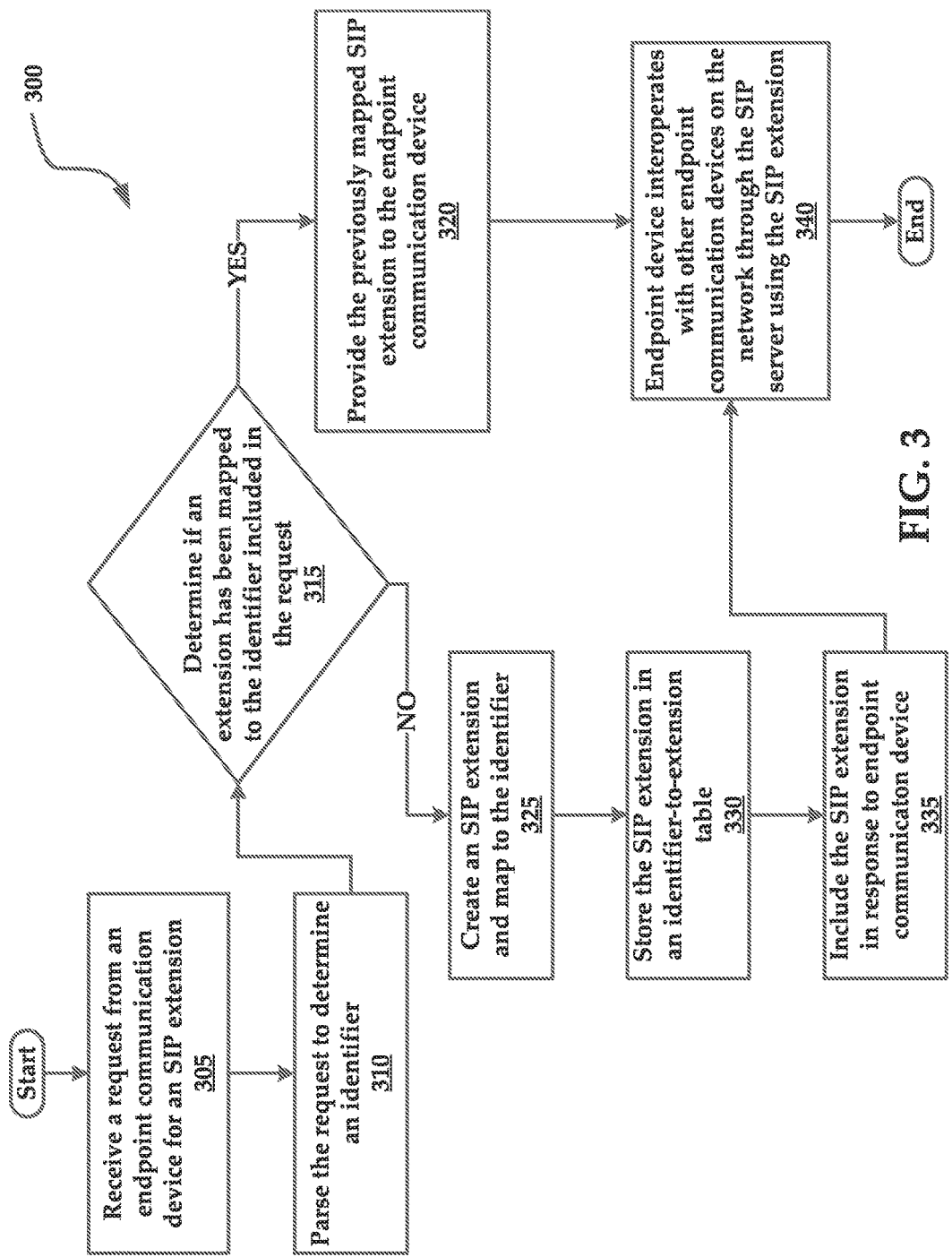
FIG. 3 is a flowchart of an example method for providing an SIP extension to an endpoint communications device.

FIG. 3 is a flowchart of an example method 300 for providing a device extension to an endpoint communications device according to some implementations. In some implementations, the method 300 can be performed by a DHCP server 130 for appropriate steps. In other implementations, method 300 can be performed by other components of the communication system.

The method may comprise a step 305 of receiving a request from an endpoint communications device for an SIP extension. Again, the request may be generated by the endpoint communications device when the endpoint communications device is placed on a network and booted up. As described above, the method can determine that the request is for an SIP extension by examining the options and/or parameters included in the request and checking for the inclusion of specific options.

According to some embodiments, the method 300 may comprise a step 310 of parsing the request to determine an identifier. Again, the identifier may comprise, in some examples, a MAC address, which can be included in the request. Next, the method may comprise a step 315 of determining if an extension has been mapped to the identifier included in the request. As mentioned before, step 315 may be executed by performing a lookup in an identifier-to-extension binding table.

If an extension has been mapped to the identifier included in the request, the method may comprise a step 320 of providing the previously mapped SIP extension to the endpoint communications device.

If no SIP extension has been mapped as determined in step 315, the method may comprise a step 325 of creating a device extension, such as an SIP extension, and mapping that extension to the identifier. The method may also comprise a step 330 of storing the mapped SIP extension in an identifier-to-extension table (e.g., MAC-to-Extension binding store). The mapped SIP extension may be included in a response that is provided back to the endpoint communications device in step 335, such as a DHCPOFFER response.

Again, the response may comprise any number of configuration parameters that allow the endpoint communications device to communicatively couple with the SIP server, such as an IP address for the endpoint communications device, an IP address of the SIP server, an extension number, authentication credentials, and so forth.

Regardless of the method used to obtain the extension, using the various parameters included in the server response, the endpoint communications device may interoperate with other endpoint communications devices on the network through the SIP server in step 340. It is noted that if a mapping is located and provided to the endpoint communications device in step 320, the endpoint communications device may interoperate with other endpoint communications devices on the network through the SIP server using the previously mapped SIP extension in step 340.

Figure 4:
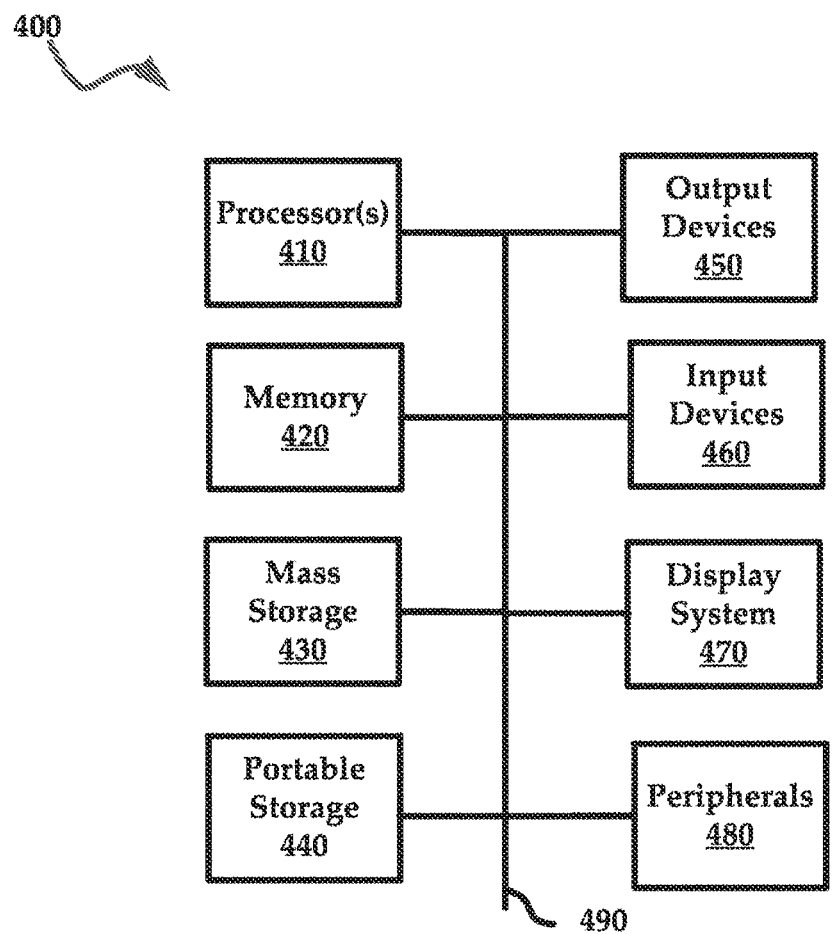
FIG. 4 illustrates an exemplary computing system that may be used to implement embodiments according to the present technology.

FIG. 4 illustrates an exemplary computing system 400 that may be used to implement an embodiment of the present systems and methods. The system 400 of FIG. 4 may be implemented in the contexts of the likes of computing systems, networks, servers, or combinations thereof. The computing system 400 of FIG. 4 includes one or more processors 410 and main memory 420. Main memory 420 stores, in part, instructions and data for execution by processor 410. Main memory 420 may store the executable code when in operation. The system 400 of FIG. 4 further includes a mass storage device 430, portable storage device 440, output devices 450, user input devices 460, a display system 470, and peripheral devices 480.

The components shown in FIG. 4 are depicted as being connected via a single bus 490. The components may be connected through one or more data transport means. The one or more processors 410 and main memory 420 may be connected via a local microprocessor bus, and the mass storage device 430, peripheral device(s) 480, portable storage device 440, and display system 470 may be connected via one or more input/output (I/O) buses.

Mass storage device 430, which may be implemented using, for example, a magnetic disk drive, solid-state memory drive, or an optical disk drive, is a non-volatile storage device for storing data and instructions for use by one or more processors 410. Mass storage device 430 may store the system software for implementing embodiments of the present invention for purposes of loading that software into main memory 420.

Portable storage device 440 operates in conjunction with a portable non-volatile storage medium, such as a floppy disk, compact disk, digital video disc, or USB storage device, to input and output data and code to and from the computer system 400 of FIG. 4. The system software for implementing embodiments of the present invention may be stored on such a portable medium and input to the computer system 400 via the portable storage device 440.

User input devices 460 provide a portion of a user interface. User input devices 460 may include an alphanumeric keypad, such as a keyboard, for inputting alphanumeric and other information, or a pointing device, such as a mouse, a trackball, stylus, or cursor direction keys. Additional user input devices 460 may comprise, but are not limited to, devices such as speech recognition systems, facial recognition systems, motion-based input systems, gesture-based systems, and so forth. For example, user input devices 460 may include a touchscreen. Additionally, the system 400 as shown in FIG. 4 includes output devices 450. Suitable output devices include speakers, printers, network interfaces, and monitors.

Display system 470 may include a liquid crystal display (LCD) or other suitable display device. Display system 470 receives textual and graphical information, and processes the information for output to the display device.

Peripherals device(s) 480 may include any type of computer support device to add additional functionality to the computer system. Peripheral device(s) 480 may include a modem or a router.

The components provided in the computer system 400 of FIG. 4 are those typically found in computer systems that may be suitable for use with embodiments of the present invention and are intended to represent a broad category of such computer components that are well known in the art. Thus, the computer system 400 of FIG. 4 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Mac OS, Palm OS, Android, iOS (known as iPhone OS before June 2010), QNX, and other suitable operating systems.

It is noteworthy that any hardware platform suitable for performing the processing described herein is suitable for use with the systems and methods provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, flash memory, any other memory chip or cartridge.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A computer-implemented method comprising:
   receiving a device extension request at a server from an endpoint communications device connected to a communication network;
   parsing the device extension request to determine an identifier for the endpoint communications device;
   creating a unique device extension for the endpoint communications device, wherein the unique device extension is unique in that the device extension is not used by any other endpoint communication devices on the communication network, and wherein the created unique device extension is derived from a port number to which the endpoint communications device is currently connected and an endpoint device type of the endpoint communications device; and
   storing a mapping of the created unique device extension and the identifier included in the device extension request; and
   providing the created unique device extension to the endpoint communications device in response to the device extension request.

2. The method of claim 1, wherein the device extension is a session initiation protocol (SIP) extension that is included in a dynamic host configuration protocol offer (DHCPOFFER) response.

3. The method of claim 1, wherein the device extension is a session initiation protocol (SIP) extension, and wherein one or more dynamic host configuration protocol (DHCP) options are enabled on an Internet protocol (IP) address that may be used by an endpoint communications device to request the SIP extension.

4. The method of claim 1, wherein the identifier includes at least one of a media access control address, an Internet protocol address, a personal identification number, a serial number, and an integrated circuit card identifier.

5. The method of claim 1, wherein the identifier includes at least one of an international mobile equipment identity number, an international mobile subscriber identity, and a mobile equipment identifier.

6. The method of claim 1, further comprising:
   evaluating the device extension request to determine the identifier; and
   evaluating the device extension request to determine if the endpoint communications device is configured to receive the device extension.

7. The method of claim 1, wherein the extension request comprises a discover message or request message provided in an address allocation protocol to an address allocation server operative to provide the device extension that is operative for use in a communication session protocol.

8. A non-transitory computer-readable storage medium with program instructions stored thereon, the instructions when executed by one or more processors cause the one or more processors to perform operations comprising:
   receiving a device extension request at a server from an endpoint communications device connected to a communication network;
   parsing the device extension request to determine an identifier for the endpoint communications device;
   creating a unique device extension for the endpoint communications device, wherein the unique device extension is unique in that the device extension is not used by any other endpoint communication devices on the communication network, and wherein the created unique device extension is derived from a port number to which the endpoint communications device is currently connected and an endpoint device type of the endpoint communications device; and
   storing a mapping of the created unique device extension and the identifier included in the device extension request; and
   providing the created unique device extension to the endpoint communications device in response to the device extension request.

9. The computer-readable storage medium of claim 8, wherein the device extension is a session initiation protocol (SIP) extension that is included in a dynamic host configuration protocol offer (DHCPOFFER) response.

10. The computer-readable storage medium of claim 8, wherein the device extension is a session initiation protocol (SIP) extension, and wherein one or more dynamic host configuration protocol (DHCP) options are enabled on an Internet protocol (IP) address that may be used by an endpoint communications device to request the SIP extension.

11. The computer-readable storage medium of claim 8, wherein the identifier includes at least one of a media access control address, an Internet protocol address, a personal identification number, a serial number, and an integrated circuit card identifier.

12. The computer-readable storage medium of claim 8, wherein the identifier includes at least one of an international mobile equipment identity number, an international mobile subscriber identity, and a mobile equipment identifier.

13. The computer-readable storage medium of claim 8, wherein the instructions further cause the one or more processors to perform operations comprising:
   evaluating the device extension request to determine the identifier; and
   evaluating the device extension request to determine if the endpoint communications device is configured to receive the device extension.

14. The computer-readable storage medium of claim 8, wherein the extension request comprises a discover message or request message provided in an address allocation protocol to an address allocation server operative to provide the device extension that is operative for use in a communication session protocol.

15. A system comprising:
one or more processors; and
logic encoded in one or more non-transitory computer-readable storage media for execution by the one or more processors and when executed operable to perform operations comprising:
receiving a device extension request at a server from an endpoint communications device connected to a communication network;
parsing the device extension request to determine an identifier for the endpoint communications device;
creating a unique device extension for the endpoint communications device, wherein the unique device extension is unique in that the device extension is not used by any other endpoint communication devices on the communication network, and wherein the created unique device extension is derived from a port number to which the endpoint communications device is currently connected and an endpoint device type of the endpoint communications device; and
storing a mapping of the created unique device extension and the identifier included in the device extension request; and
providing the created unique device extension to the endpoint communications device in response to the device extension request.

16. The system of claim 15, wherein the device extension is a session initiation protocol (SIP) extension that is included in a dynamic host configuration protocol offer (DHCPOFFER) response.

17. The system of claim 15, wherein the device extension is a session initiation protocol (SIP) extension, and wherein one or more dynamic host configuration protocol (DHCP) options are enabled on an Internet protocol (IP) address that may be used by an endpoint communications device to request the SIP extension.

18. The system of claim 15, wherein the identifier includes at least one of a media access control address, an Internet protocol address, a personal identification number, a serial number, and an integrated circuit card identifier.

19. The system of claim 15, wherein the identifier includes at least one of an international mobile equipment identity number, an international mobile subscriber identity, and a mobile equipment identifier.

20. The system of claim 15, wherein the logic when executed is further operable to perform operations comprising:
evaluating the device extension request to determine the identifier; and
evaluating the device extension request to determine if the endpoint communications device is configured to receive the device extension.

* * * * *